(12) United States Patent
Kamio et al.

(10) Patent No.: US 6,442,978 B1
(45) Date of Patent: Sep. 3, 2002

(54) APPARATUS FOR SINTERING A POROUS GLASS BASE MATERIAL AND A METHOD THEREFOR

(75) Inventors: Takeshi Kamio; Hiroyuki Koide; Hiroshi Tsumura; Tadakatsu Shimada; Hideo Hirasawa, all of Annaka (JP)

(73) Assignee: Shin-Etsu Chemical Co. Ltd., Tokyo (JP)

(*) Notice: Subject to any disclaimer, the term of this patent is extended or adjusted under 35 U.S.C. 154(b) by 0 days.

(21) Appl. No.: 09/520,966

(22) Filed: Mar. 8, 2000

(30) Foreign Application Priority Data

Mar. 10, 1999 (JP) .............................. 11-062636
Mar. 12, 1999 (JP) .......................... 11-065948

(51) Int. Cl.$^7$ .............................................. C03B 37/07
(52) U.S. Cl. ............................. 65/488; 65/377; 65/384; 65/484; 65/162; 65/163; 432/45
(58) Field of Search .................. 432/45; 65/484, 65/488, 162, 163, 377, 384

(56) References Cited

U.S. PATENT DOCUMENTS

| | | | | |
|---|---|---|---|---|
| 5,133,796 A | * | 7/1992 | Tsuchiya et al. | 65/144 |
| 5,624,474 A | * | 4/1997 | Tsuchiya et al. | 65/484 |
| 6,138,480 A | * | 10/2000 | Blais | 65/484 |
| 6,178,778 B1 | * | 1/2001 | Kenmochi et al. | 65/381 |

FOREIGN PATENT DOCUMENTS

| | | | | |
|---|---|---|---|---|
| JP | 1242434 | * | 9/1989 | ................. 65/163 |
| JP | 8-143324 | | 6/1996 | |

OTHER PUBLICATIONS

Patent Abstract of Japan, Sumitomo Electric, JP 03 040931 A, vol. 15, No. 177, May 7, 1991.
Patent Abstract of Japan, Sumitomo Electric Ind. Ltd., JP 63 030338 A vol. 12, No. 237, Jul. 6, 1988.
Patent Abstract of Japan, Furukawa Electric Co., Ltd., JP 04 238828 A, Vol. 17, No. 1, Jan. 5, 1993.
Patent Abstract of Japan, Fujikura Ltd., JP 05 221676 A, vol. 17, No. 674, Aug. 31, 1993.
Patent Abstract of Japan, Sumitomo Electric Ind. Ltd., JP 62 187128 A, Vol 12, No. 37, Feb 4, 1988.
Patent Abstract of Japan, Fujikura Ltd., JP 04 275933, vol. 17, No. 73, Feb. 15, 1993.

* cited by examiner

*Primary Examiner*—James Derrington
(74) *Attorney, Agent, or Firm*—Pillsbury Winthrop LLP (57) ABSTRACT

Apparatus (700) for sintering a glass base material (2) which is a base material for an optical fiber. The sintering apparatus (700) includes: a control unit which varies a condition for sintering the glass base material; and a furnace (12) which sinters the glass base material by heating the glass base material in an atmosphere of dehydration gas and inert gas. The control unit includes a drive source (3) which supplies the glass base material to the furnace at various speeds. The control unit includes a temperature control unit which controls the temperature of a heating source provided in the furnace.

20 Claims, 6 Drawing Sheets

| | DESCENDING RATE OF FIRST HALF (mm/min) | DESCENDING RATE OF END HALF (mm/min) | ECCENTRICITY RATIO (%) | ELLIPTICITY (%) |
|---|---|---|---|---|
| EXAMPLE 1 | 0.8 | 3.5 | 0.02 | 0.03 |
| EXAMPLE 2 | 1.5 | 3.5 | 0.05 | 0.03 |
| EXAMPLE 3 | 2.2 | 3.5 | 0.06 | 0.04 |
| COMPARISON EXAMPLE 1 | 3.5 | 3.5 | 0.51 | 0.50 |

FIG. 6

APPARATUS FOR SINTERING A POROUS GLASS BASE MATERIAL AND A METHOD THEREFOR

This patent application claims priority based on a Japanese patent applications H11-062636 filed on Mar. 10, 1999 and H11-065948 filed on Mar. 12, 1999 the contents of which are incorporated herein by reference.

BACKGROUND OF THE INVENTION

1. Field of the Invention

The present invention relates to a sintering apparatus which dehydrates and sinters a porous glass base material serving as a raw material for an optical fiber so as to produce a transparent glass, and a method of sintering the porous glass base material.

2. Description of the Related Art

An optical fiber is made of the porous glass base material, as a raw material, comprised of: a core in which silicon tetrachloride ($SiCl_4$) as a main material and a doping material having increasing refractive index are vaporized and are hydrolyzed in the oxyhydrogen blaze so that the glass particulates thus produced are deposited and which presents a high refractive index; and a clad in which glass particulates are deposited and whose reflection rate is lower than that of the core. The porous glass base material is usually produced such that the glass particulates are deposited by a vapor-phase axial deposition (VAD) method, outside vapor deposition (OVD) method or the like. In a furnace tube into which the porous glass base material is inserted, the base material is heated and sintered so as to dehydrate and perform the transparency-vitrification process on the base material in the dehydration-reactive gas and inert gas atmosphere while the base material descends, so that an optical fiber preform comprised of a core and a clad can be obtained. After this optical fiber preform is elongated at a desired diameter and is then drawing-performed by a drawing apparatus, an optical fiber can be obtained.

During the sintering of this porous glass base material, conditions such as the flow rate of the dehydration-reactive gas and inert gas, the passing (descending) speed of the base material through a heating region, and the heating temperature in the heating region are kept constant. With each of such conditions being kept constant, the thermal energy necessary for processing the dehydration and the transparency-vitrification is supplied evenly to the porous glass base.

However, the heat thus supplied is not sufficient in order to perform the sintering uniformly. As a result, the sintered portion and unsintered portion do not become concentric, and those are mixed in an asymmetric manner. Moreover, when the unsintered portion is sintered, the glass which was already sintered and thus had low viscosity is also involved unwantedly so as to contract unevenly. Thus, the core is displaced from the axial center of the base material so as to cause eccentricity. This eccentricity further causes the supply of the thermal energy to become non-uniform, so that the periphery of the base material tends to present the form of an ellipse. Let us call this tendency ellipsization. Once the eccentricity and ellipsization occur, the sintering process proceeds while the non-uniform contraction occurs continuously. Therefore, the whole of the optical fiber preforms suffer from the eccentricity and ellipsization.

Consequently, the optical fiber obtained by performing the drawing process on these optical fiber preforms present the eccentricity and ellipsization. When these optical fibers thus produced are connected to each other by means of adhesion or fusion, contact loss is caused because of difference of shapes in coupling surfaces between the core and clad, displacement of the axial center of the core, and the difference in core diameters.

When manufacturing the porous glass base material, there is available a method by which the clad will be further grown around its peripheral by the OVD method after the core and clad are formed by the VAD method. Now, in the conventional practice, the sintering is carried out in a manner that the porous glass base material is sintered while keeping constant the flow rate of the chlorine gas and inert gas serving as the dehydration-reactive gas as well as keeping the descending speed of the base material constant and keeping the condition of the heating temperature fixed. However, there occurs a difference between remaining rates of the dehydration-reactive gases in the clad formed by the VAD method and the clad formed by OVD method. If the 1000 ppm chlorine gas remains in the optical fiber sintered, the refractive index increases by approximately $10^{-5}$. Thereby, the difference between the chlorine gas remaining rates in the clad causes a great deal of refractive index difference in the clad. Thus, the distribution characteristics of the optical fiber material are deteriorated. Moreover, as the porous glass base material descends in the furnace tube during a sintering process, a temperature gradient in the furnace tube and the flow rate of gas within the furnace tube change, so that the remaining rate of the chlorine gas in the axial direction of the base material becomes non-uniform and the difference in the refractive indexes fluctuates, thus causing a problem where the cut-off wavelength can not be kept constant in the axial direction.

SUMMARY OF THE INVENTION

Therefore, it is an object of the present invention to provide sintering apparatus for porous glass base material, as well as a method therefor, which does not cause the eccentricity of the core and the ellipsization of the periphery of the glass material while sintering and dehydrating the porous glass base material and performing the transparency-vitrification process on the porous glass base material. It is another object to provide sintering apparatus, as well as a method therefor, capable of suppressing the refractive indexes inside the clad in the event that the porous glass base material is sintered and dehydrated and transparency-vitrification processed. These objects are achieved by combinations described in the independent claims. The dependent claims define further advantageous and exemplary combinations of the present invention.

According to one aspect of the present invention, there is provided apparatus for sintering a glass base material which is a base material for an optical fiber, the sintering apparatus comprising: a control unit which varies a condition for sintering the glass base material; and a furnace which sinters the glass base material by heating the glass base material in an atmosphere of dehydration gas and inert gas, the control unit including a drive source which supplies the glass base material to the furnace.

Preferably, the control unit includes a first sensor, connected to said drive source, which detects a position of the glass base material inside said furnace so that the drive source varies the speed of the glass base material which descends through the furnace, based on the position of the glass base material, detected by the first sensor.

The furnace further includes: a heating source, provided in the periphery of said furnace, which heats the glass base material; and a gas introducing pipe, connected to said furnace, which introduces a chlorine gas serving as the dehydration gas, and a helium gas serving as the inert gas into said furnace.

Preferably, the drive source may vary the speed at which the glass base material descends in a manner that the descending speed of the first half of the glass base material in a region corresponding to said heating source is slower than that of the end half of the glass base material in said region.

Moreover, a maker may be provided in the glass base material so that the position of the glass base material can be detected by the first sensor.

Moreover, the descending speed of the base material may be changed at once or varied in a gradual manner or changed in a step-by-step manner.

According to the another aspect of the present invention, there is provided a sintering apparatus, wherein the control unit includes a temperature control unit which controls the temperature of said heating source via a second sensor provided in said furnace.

The temperature control unit may perform a proportional integral and differential operation.

Moreover, the gas introducing pipe may branch out to a dehydration-reactive gas passage for introducing the chlorine gas and an inert gas passage for introducing the helium gas.

Moreover, there may be provided a flow rate control unit which varies a flow rate ratio of dehydration-reactive gas to that of the inert gas.

Moreover, the dehydration-reactive gas passage may include a first flow rate meter and a first flow rate control valve, and the inert gas passage may include a second flow rate meter and a second flow rate control valve, and there may be provided a flow rate control unit connected to both the first and second flow rate meters and there may be provided a second drive source connected to the flow rate control unit and the first and second flow rate control valves.

Moreover, it is preferable that the ratio of gas passing through the dehydration-reactive gas passage to gas passing through said inert gas passage is in the range of approximately 10% to 50%.

According to still another aspect of the present invention, there is provided apparatus for manufacturing an optical fiber, comprising: a glass base material generating apparatus which generates glass base material serving as a raw material for the optical fiber; a glass base material dehydrating and sintering apparatus which dehydrates and sinters the glass base material, the glass base dehydrating and sintering apparatus including: a control unit which varies a condition for sintering the glass base material; and a furnace which sinters the glass base material by heating the glass base material in an atmosphere of dehydration gas and inert gas, wherein the control unit includes a drive source which supplies the glass base material to the furnace; a glass base material first elongating apparatus which elongates the glass base material to generate a glass rod; a glass rod second elongating apparatus which elongates the glass rod for the second time to generate a preform which is parent material of the optical fiber; and a preform drawing apparatus which draws the preform to produce the optical fiber.

According to still another aspect of the present invention, there is provided a method of sintering a glass base material which is a base material for an optical fiber, the sintering method comprising: varying a condition for sintering the glass base material; the varying condition including: supplying the glass base material to a furnace; and sintering the glass base material in the furnace by heating the glass base material in an atmosphere of dehydration gas and inert gas.

According to still another aspect of the present invention, there is provided a method of manufacturing an optical fiber, comprising: generating a glass base material serving as a raw material for the optical fiber; varying a condition for sintering the glass base material; the varying condition including: supplying the glass base material to a furnace; and sintering the glass base material in the furnace by heating the glass base material in an atmosphere of dehydration gas and inert gas; elongating the glass base material to generate a glass rod; elongating the glass rod for the second time to generate a preform which is a parent material for the optical fiber; and drawing the preform to produce the optical fiber.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
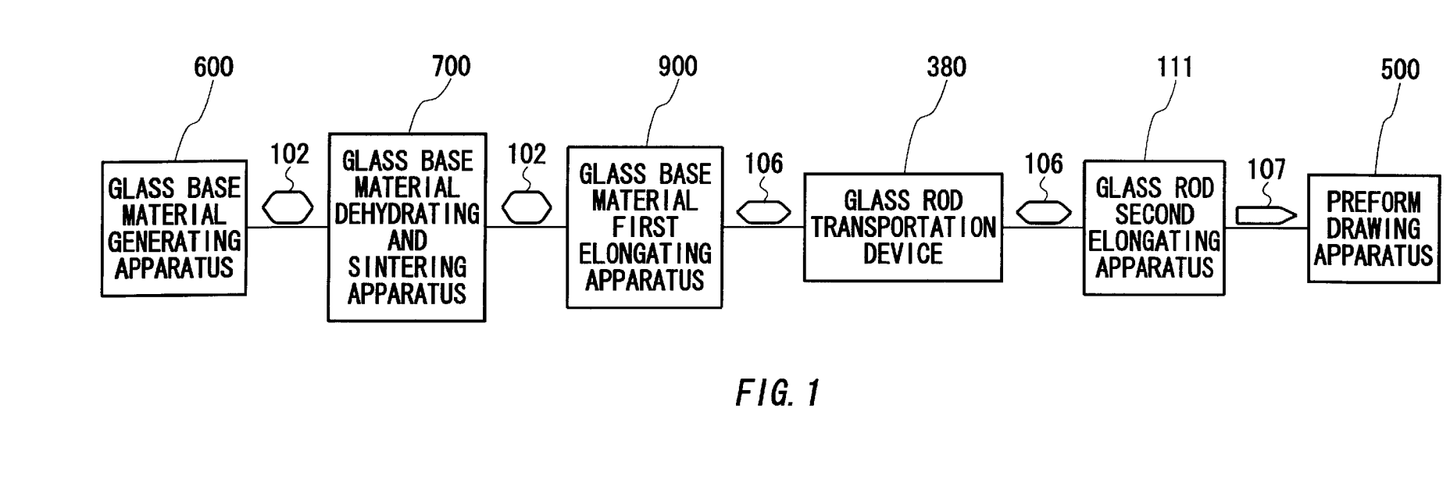
FIG. 1 shows a system of an optical fiber manufacturing apparatus.

FIG. 1 shows a system of an optical fiber manufacturing apparatus. The system of the optical fiber manufacturing apparatus comprises: a glass base material generating apparatus 600 which generates a glass base material 102 serving as a raw material for the optical fiber; a glass base material dehydrating and sintering apparatus 700 which dehydrates and sinters the glass base material 102; a glass base material first elongating apparatus 900 which elongates the glass base material 102 to generate a glass rod 106; a glass rod transportation device 380 which transports the glass rod 106; a glass rod second elongating apparatus 111 which elongates the glass rod 106 for the second time to generate a preform 107; and a preform drawing apparatus 500 which draws the preform 107 to generate an optical fiber.

Figure 2:
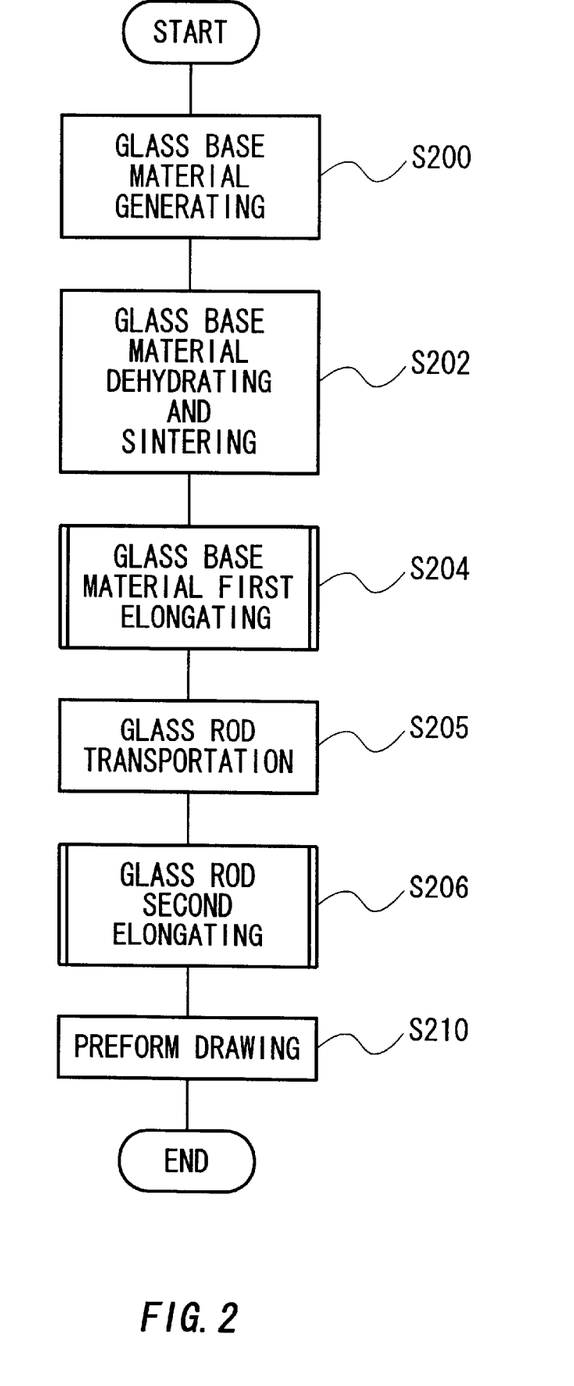
FIG. 2 shows an optical fiber manufacturing method.

FIG. 2 shows an optical fiber manufacturing method. The glass base material 102 is generated by the glass base material generating apparatus using the vapor-phase axial deposition (VAD) method or the like (S200). The glass base material 102 is then dehydrated in a chlorine gas atmosphere and sintered in an inert gas atmosphere by the glass material dehydrating and sintering apparatus 700 (S202).

The diameter of the glass base material 102 is normally 110 mm to 200 mm, compared with a diameter of 30 mm to 80 mm which is most practically used for drawing the optical fiber. Therefore, the dehydrated and sintered glass base material 102 is elongated first by the glass base material first elongating apparatus 900 to produce a glass rod 106 (S204).

The glass rod 106 is transported by the glass rod transportation device 380 (S205). The glass rod 106 is then heated and elongated by the glass rod second elongating apparatus 111 to a predetermined diameter, thus producing a preform 107 (S206). The preform 107 is heated and drawn to a filament-like form by the preform drawing apparatus 500 to produce an optical fiber (S210).

Figure 3:
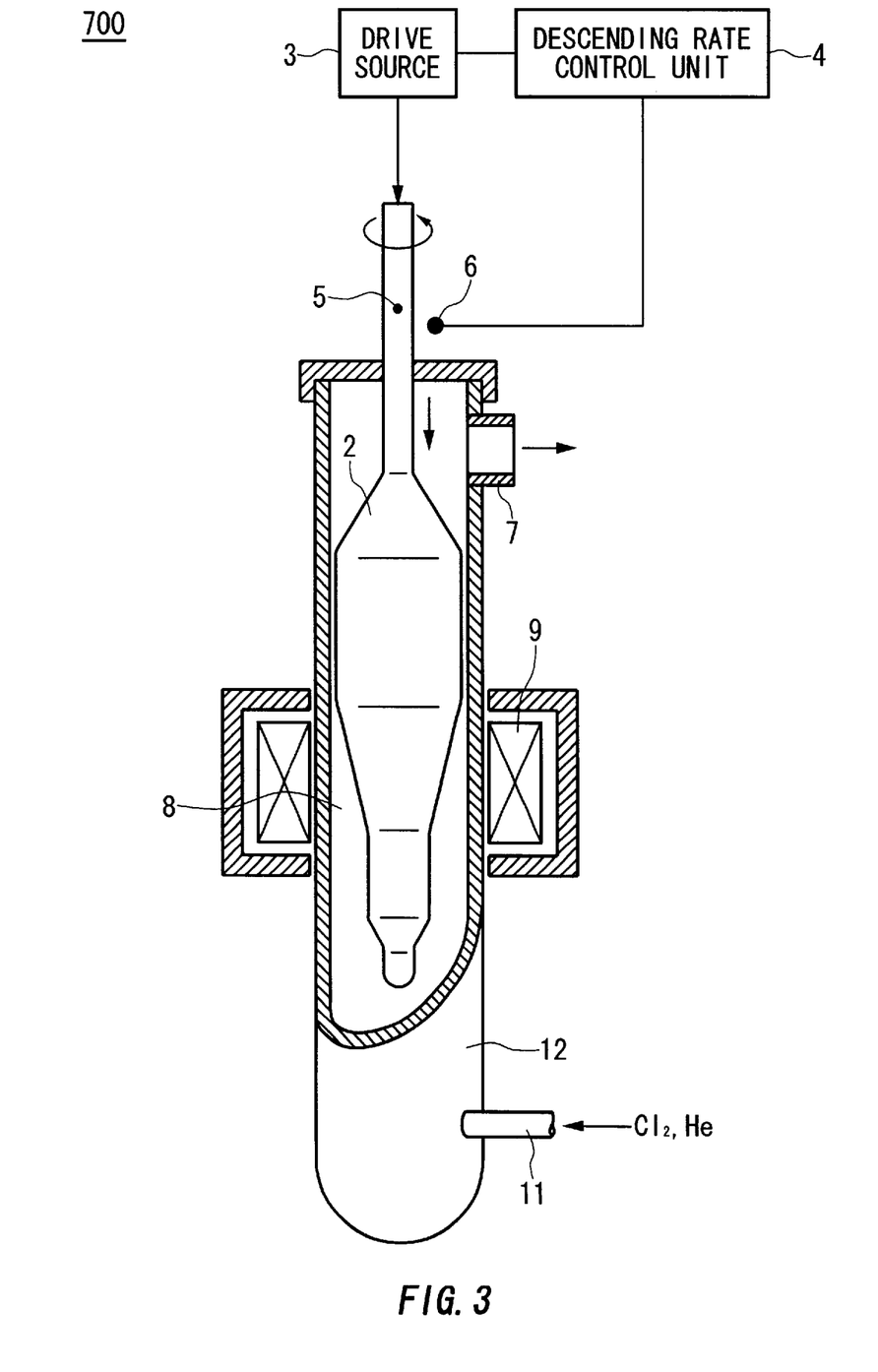
FIG. 3 shows a porous glass base material sintering apparatus according to the first embodiment.

FIG. 3 shows a porous glass base material sintering apparatus 700 according to the first embodiment. The porous glass base material sintering apparatus 700 comprises: a furnace tube 12 and a heat source 9 provided in the periphery of the furnace tube 12. The sintering apparatus 700 further includes a drive source 3 which supplies the porous glass base material in the form of a rod body, into the furnace tube 12, and a descending rate control unit 4, connected to the drive source 3, which controls the speed at which the base material descends through the furnace tube 12. The sintering apparatus 700 still further includes a gas introducing pipe 11, provided at and connected to the lower portion of the furnace tube 12, which is connected to a supply source for supplying a dehydration-reactive gas such as chlorine gas and to another supply gas for supplying an inert gas such as helium gas. The sintering apparatus 700 still further includes a discharge pipe 7 provided in the upper portion of the furnace pipe 12.

The rod body 2 of the porous glass base material is provided with a marker 5. By providing the marker 2 with the rod body 2, a sensor 6 which is connected to the descending rate control unit 4 can detect that the half of the rod body 2 passes through a thermal region 8 defined by the heat source 9.

Next, the sintering of the porous glass base material is carried out in the following manner.

The porous glass base material in which the glass particulates are deposited using the outside vapor deposition (OVD) method is used as the rod body 2 in this first embodiment.

The chlorine gas and helium gas are supplied from respective supply sources (not shown) to the gas introducing pipe 11. The chlorine gas and the helium gas are mixed and then introduced into the furnace tube 12 so as to impregnate the furnace tube 112. The thermal region 8 is heated by the heat source 9. The rod body 2 of the porous glass base material slowly descends and passes the thermal region 8 while the rod body 2 is being rotated about an axis by the drive source 3 which is controlled by the descending rate control unit 4. The rod body 2 of the porous glass base material is sintered by the thermal process so that the dehydration and transparency-vitrification is performed on the rod body 2.

When the half of the porous glass base material of the rod body 2 passes the thermal region, the sensor 6 senses the marker 5 and outputs a felt signal to the descending rate control unit 4. Then, the descending rate control unit 4 is triggered by this felt signal serving to increase or decrease the descending rate of the rod body 2 so that the descending rate of the rod body 2 of the porous glass base material can be adjusted. Then, the sintering process continues until the sintering process of the rod body 2 is completed.

The first embodiment is characterized by that the descending speed of the first half of the rod body 2 in the thermal region 8 corresponding to the heating source 9 is set to a slower speed than the descending speed of the end half of the rod body 2 in the thermal region 8 corresponding to the heat source 9.

By setting the descending speed of the first half of the rod body 2 to a slower speed than that of the end half thereof, the thermal energy is excessively supplied to the rod body 2 from the heating source 9 at the time of starting the sintering process, so that the sintering process can be performed evenly and uniformly on the rod body 2 without causing the eccentricity and the ellipsization of the periphery of the rod body 2. Since the rod body 2 of the porous glass base material is sintered continuously and uniformly, varying the speed of the descending speed of the rod body 2 does not cause eccentricity and ellipsization. Recall that we have called this tendency in which the glass base material is likely to present the form of an ellipse, ellipsization.

It is desirable that the descending speed of the rod body 2 of the porous glass base material in the first half of the thermal region 8 is in the range of approximately 0.8 mm per minute to 2.2 mm per minute against the descending speed of the rod body 2 of the porous glass base material in the end half of the thermal region set at 3.5 mm per minute. If the descending speed of the rod body 2 in the first half of the thermal region 8 is slower than the above desirable speed setting condition, the rod body 2 may be heated excessively in an unnecessary manner, production efficiency therefor deteriorates. On the other hand, if the descending speed of the rod body 2 in the first half of the thermal region 8 is faster than the above desirable speed setting condition, the thermal energy supplied to the base material rod body 2 at the time of start of the sintering process is not sufficient, so that the eccentricity or ellipsization may be caused.

The descending speed of the base material may be changed at once or varied in a gradual manner or changed in a step-by-step manner, and the descending speed is preferably less than 5.0 mm per minute. If faster than the sped at 5.0 mm per minute, the sintering may not be sufficient.

Accordingly, the optical fiber thus produced according to the first embodiment is of high quality because the core does not have eccentricity and ellipsization of the periphery.

Evaluation of the First Embodiment

According to the above described first embodiment, three porous glass base material are sintered under the following three conditions utilizing the porous glass base material sintering apparatus 700 of the first embodiment. The temperature of the heating source 9 is set to 1600° C. The respective descending speeds of the base material rod body 2 in the first half of the thermal region 8 are set to 0.8 mm per minute, 1.5 mm per minute and 2.2. mm per minute. Then, the each of respective speeds are changed to 3.5 mm per minute when the first half of the porous glass base material rod body 2 passes the thermal region 8. In other words, the descending speed of the end half of the porous glass base material rod body 2 is switched to the speed of 3.5 mm per minute.

In order to compare the first embodiment to the standard practice, we have performed the comparison example 1 in which the descending speed remains at 3.5 mm per minute throughout the sintering process.

Figure 4:
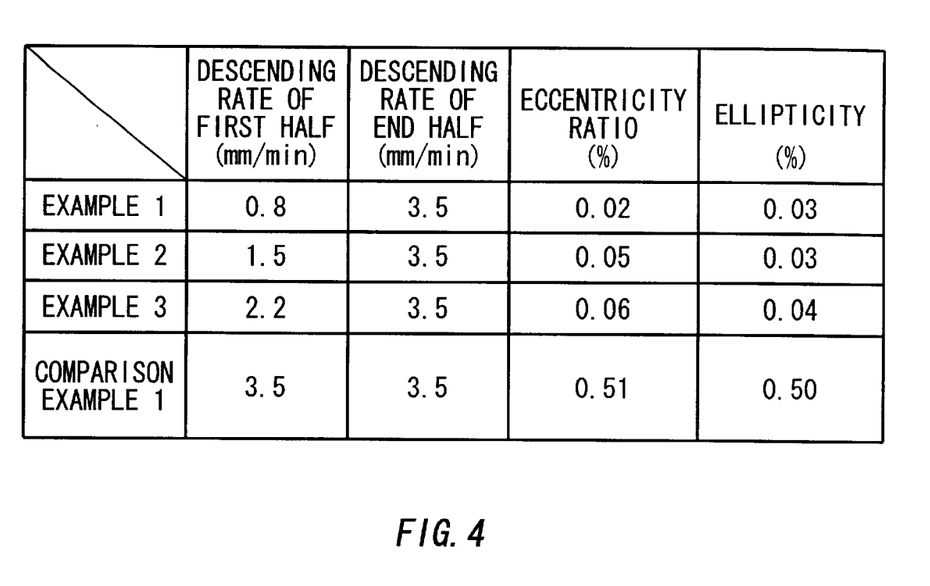
FIG. 4 is a table showing three experimental examples employing the first embodiment where each example is categorized into the descending speed (mm per minute) of the first half at the thermal region 8, the descending speed (mm per minute) of the end half at the thermal region 8, the eccentricity ratio (%) and the ellipticity (%).

FIG. 4 is a table showing three experimental examples employing the first embodiment where each example is categorized into the descending speed (mm per minute) of the first half at the thermal region 8, the descending speed (mm per minute) of the end half at the thermal region 8, the eccentricity ratio (%) and the ellipticity (%)

In order to show the characteristic of the eccentricity of the optical fiber preform sintered, there is calculated the eccentricity ratio in a manner that the displacement between the axial center of the core and the center of the optical fiber preform is divided by the diameter of the optical fiber preform. Moreover, in order to characterize the ellipsization, there is calculated the ellipticity in a manner that the longer diameter of the optical fiber preform is divided by the shorter diameter thereof. The results are shown in FIG. 4.

As FIG. 4 indicates, in the optical fiber preforms obtained using the values set within the first embodiment the eccentricity ratio and ellipticity are both significantly small compared to the comparison example 1 presenting a relatively large eccentricity and ellipticity, thus showing that the optical fiber preforms obtained according to the present embodiment turns out to be of very high quality.

Since the optical fiber preforms obtained from the sintering apparatus and method for sintering the porous glass base material according to the present embodiment suppress the eccentricity of the core and the ellipsization of the base material, highly qualified optical fiber preforms are obtained. Thus, the highly qualified optical fibers having little coupling loss can be manufactured.

Figure 5:
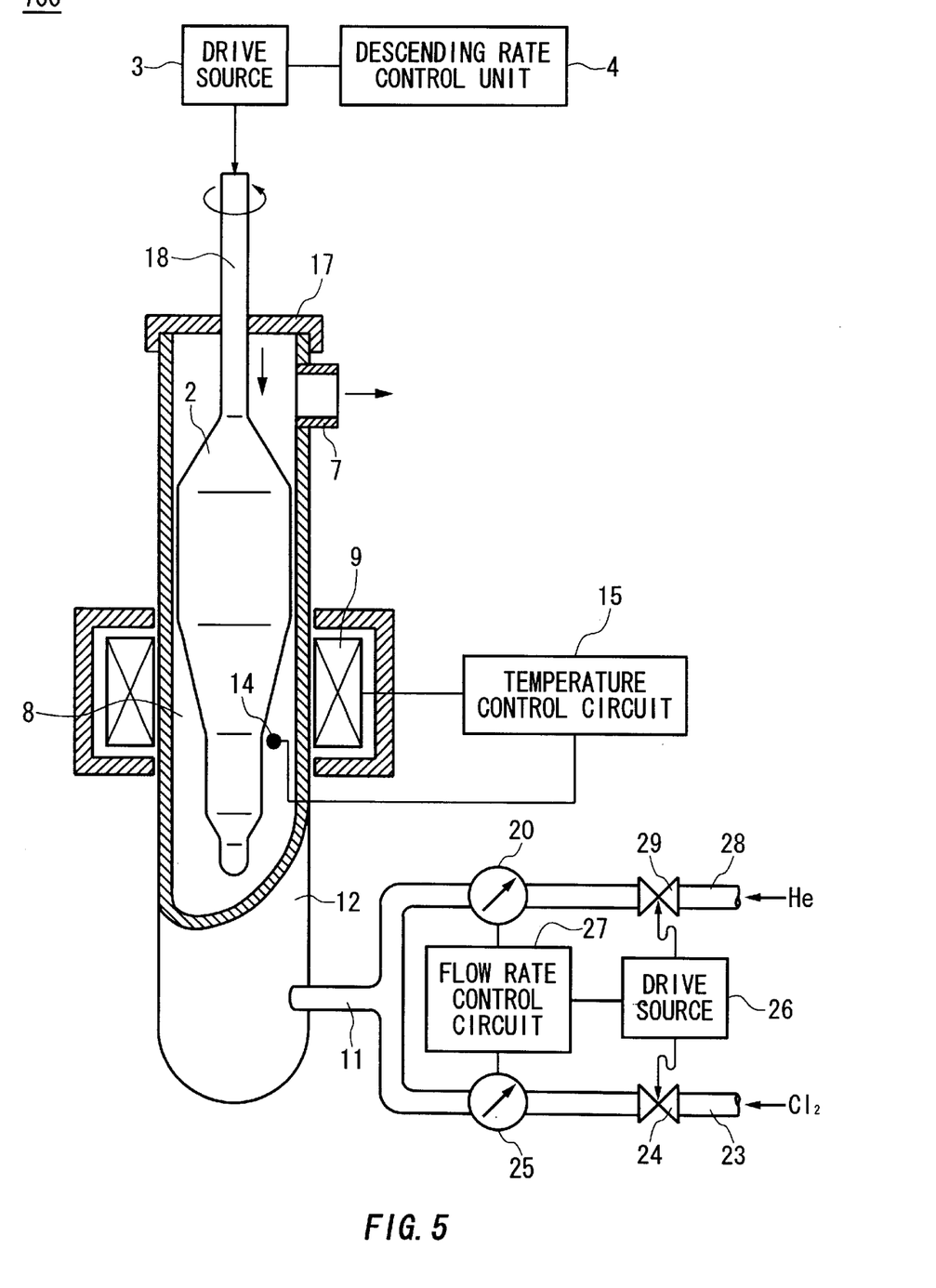
FIG. 5 shows another porous glass base material sintering apparatus according to the second embodiment.

FIG. 5 shows another porous glass base material sintering apparatus 700 according to the second embodiment. The porous glass base material sintering apparatus 700 comprises: a lid 17 through which an axial body 18 penetrates; a furnace tube 12; and a heat source 9 provided in the periphery of the furnace tube 12. The sintering apparatus 700 further includes a drive source 3, connected to the axial body 18, which supplies the porous glass base material in the form of a rod body, into the furnace tube 12, and a descending rate control unit 4, connected to the drive source 3, which controls the speed at which the base material descends through the furnace tube 12. The sintering apparatus 700 still further includes: a temperature measuring sensor 14 for measuring temperature of the rod body 2 provided in the thermal region 8; and a temperature control circuit 15 which PID-controls the heat source 14 and which is connected to the temperature measuring sensor 14. Here PID stands for Proportional Integral and Difference operation. The sintering apparatus 700 still further includes a gas introducing pipe 11, provided at and connected to the lower portion of the furnace tube 12, which branches out to a dehydration-reactive gas passage 23 and an inert gas passage 28. The dehydration-reactive passage 23 is connected to a gas supply source (not shown) for supplying the dehydration-reactive gas via a flow rate adjusting valve 24 while the inert gas passage 28 is connected to a gas supply source (not shown) for supplying the inert gas via a flow rate adjusting valve 29. The flow rate meter 25 provided in the dehydration-reactive gas passage 23 and the flow rate meter 20 provided in the inert gas passage 28 are connected to the a flow rate control circuit 27. A drive source 26 controlled by the flow rate control circuit 27 is connected to both the flow rate adjusting valve 24 and flow rate adjusting valve 29. The sintering apparatus 700 still further includes a discharge pipe 7 provided in the upper portion of the furnace pipe 12.

The present embodiment is characterized in what to follow.

In an atmosphere of the dehydration-reactive gas and inert gas which are supplied from the gas introducing pipe 11 connected to the flow rate adjusting valves 24, 29 having flow rate control unit 27 and which are introduced into the furnace tube 12, the porous glass base material 2 which is connected to the axial body 18 and is inserted to the furnace tube 12 descends rotatingly by the drive source such as a motor. While the porous glass base material 2 is being sintered by the heat source 9 connected to the temperature control circuit 15 provided in the periphery of the furnace tube 12, the ratio of the flow rate of the inert gas controlled by the flow rate control circuit 7 against that of the dehydration-reactive gas, the descending speed controlled by the descending rate control unit 4, and the temperature of the heat source 9 controlled by the temperature control circuit 15 are varied. Moreover, the present embodiment is characterized by that at least one of factors among the flow rate ratio, the descending speed and the temperature of the heat source 9 are varied to achieve the optimized sintering operation.

It is preferable that the ratio of the flow rate of the inert gas against that of the dehydration-reactive gas be in the range of approximately 10–50%. If less than 10%, a dehydration process will not be completed. Moreover, since the upper portion of the porous glass base material 2 has longer contact time with the dehydration-reactive gas, the dehydration-reactive gas will be introduced in a great deal of amount thereof. If greater than 50%, the dehydration-reactive gas invades into the porous glass base material excessively, so that such the dehydration-reactive gas remains unevenly after the sintering process. Thereby, the refractive index difference inside the clad increases. By lowering the ratio of flow rate of the dehydration gas against that of inert gas after a change, the uneven invasion of the dehydration-reactive gas into the porous glass base material can be suppressed.

The descending speed is preferably in the range approximately 0.3 mm–5.0 mm per minute. If slower than 0.3 mm per minute, the sintering effect deteriorates for an excessive heating results. If faster than 5.0 mm per minute, the sintering will not be completed because of insufficient heating. By setting the descending speed faster after the change, the excessive supply of the chlorine gas to the upper portion of the porous glass base matieiral will be suppressed, so that the fluctuation of the refractive index difference in the longitudinal direction becomes small, so as to improve the productivity.

It is preferable that the temperature difference of the heat source prior to and after the change be set within approximately 50° C. When the temperature difference exceeds 50° C., the sintering will not be accomplished evenly.

It is preferable that the temperature of the heat source 9 be in the range of approximately 1300° C.–1650° C.

By setting the temperature of the heat source 9 to a higher temperature after the change, the dehydration-reactive gas in the upper portion of the porous glass base material 2 can be sufficiently scattered. Moreover, it can compensate for possible insufficient vitrification due to the increase of the speed. Moreover, the uneven remains of the dehydration-reactive gas in the axial direction of the base material after the sintering process can be suppressed.

Moreover, it is preferable that there be a plurality of positions at which at least one of the gas flow rate ratio of the dehydration-reactive gas against the inert gas, descending speed of the base material and the furnace heating temperature is changed.

Moreover, the gas flow rate ratio, the descending speed of the base material and the temperature at which the furnace is heated may be varied in a step-by-step manner or may be varied in a gradual manner.

Thereby, the uneven remains of the dehydration-reactive gas in the base masterial can be suppressed, so that the refractive index difference inside the clad can be made uniform.

Moreover, the present embodiment is characterized in that at least one of three (1)–(3) conditions:
(1) the descending speed at which the glass base material descends through the furnace tube 12;
(2) the temperature at which the glass base material is heated by the heat source 9 which is controlled by the temperature control circuit 15; and
(3) the flow rate ratio of the dehydration-reactive gas to that of the inert gas to be introduced into the furnace tube 12 are varied as described above.

The operation of the sintering apparatus 700 according to the second embodiment will be described in detail.

After the core and clad are formed by the VAD method, the porous glass base material 2 in which the clad is further grown by the OVD method is inserted into the furnace tube 12. The chlorine gas serving as the dehydration-reactive gas is supplied from the supply source (not shown) into the gas introducing pipe 11 via the flow rate adjusting valve 24. At the same time, the helium gas serving as the inert gas is supplied from the supply source (not shown) to the gas introducing pipe 11 via the flow rate adjusting valve 29. Then, the chlorine gas and helium gas are mixed so as to be introduced into the furnace tube 12.

The porous glass base material 2 descends in a manner that the base material is rotated by the drive source 3 such as a motor whose descending speed is controlled by the descending rate control unit 4. The temperature control circuit 15 controls the heat source 9 by the proportional integral and differential (PID) operation based on the temperature measuring sensor 14. When the porous glass base material 2 passes the heat source 9, the base material 2 is sintered and the dehydration reaction and transparency-vitrification processes are performed thereon. When the base material 2 descends up to a predetermined position, the descending speed is changed by adjusting the revolving speed of the motor 3 controlled by the descending rate control circuit 4. The temperature of the heat source 9 is changed by the temperature control circuit 15 so that the temperature detected by the temperature measuring sensor 14 is set to a predetermined temperature. The drive source 3 is driven by the flow rate control unit 4 and the flow rate adjusting valves 24, 29 are controlled so that ratio of the dehydration-reactive gas against the flow rate of the inert gas is varied and the sintering process continues.

At the start of the sintering process, while the porous glass base material 2 descends at 1.2 mm per minute, the chlorine gas serving as dehydration-reactive gas whose flow rate is 50% is mixed. Thereafter, the mixed gas is introduced into the furnace tube 12 at the rate of 10L per minute and the sintering is performed with the heating source set to the temperature of 1600° C. When the base material 2 reaches the descending level of 50% of a stroke, the descending speed is changed to 2.0 mm per minute by controlling the motor by the descending rate control unit 4. When the base material 2 reaches to the level of 75% of the stroke, the descending speed is changed to 3.0 mm per minute. At the same time, the drive source 26 is driven by the flow rate control circuit 7 so that the predetermined rate is achieved observing the flow rate meters 5, 10. After the chlorine gas whose flow rate is 30% against the flow rate of helium gas is mixed, the mixed gas is introduced into the furnace tube 12 at the flow rate of 10L per minute. Moreover, the heating source 9 is controlled at 1630° C. by the temperature control circuit 15 so as to continue the sintering process.

In order to compare the above described preferred example to other comparison example, the comparison example is taken up in a manner that the descending speed of the porous glass base material is set to 2.3 mm per minute constantly, and the mixed a gas having constant 40% chlorine gas against the helium gas is used and the heating temperature is constantly kept at 1590° C. so as to perform the sintering process with other conditions being same as the above preferred embodiment.

Figure 6:
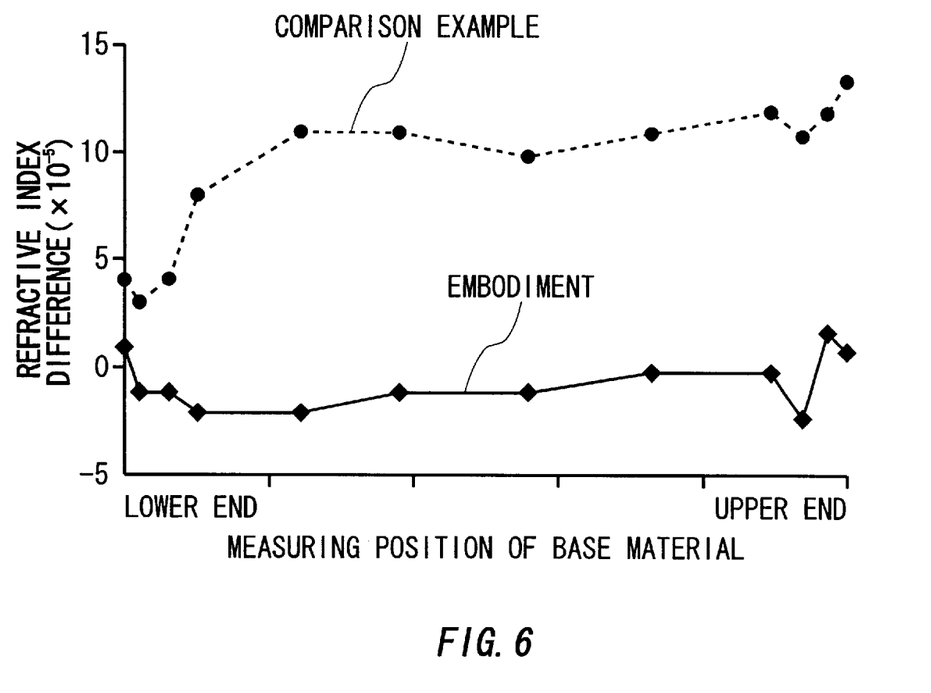
FIG. 6 shows correlation between the position of the glass base and the refractive index differences in the present embodiment (indicated with solid line) and the comparison example (dotted line).

FIG. 6 shows correlation between the position of the glass base and the refractive index differences in the present embodiment (indicated with solid line) and the comparison example (dotted line). In both present embodiment and the comparison example, the refractive indexes of the clad are measured at 12 different positions from the lower end through the upper end of the porous glass base. The horizontal axis indicates the measuring positions of the glass base material while the vertical axis indicates the refractive index difference in which the refractive index of the clad formed by the VAD method is subtracted from the refractive index of the clad formed by the OVD method.

Referring to FIG. 2, the fluctuating range of the refractive index difference of the base material after the sintering process is less than $2 \times 10^{-5}$ in the present embodiment while more than 6 times the fluctuating range compared to the present embodiment is found in the comparison example. If the fluctuating range is less $5 \times 10^{-5}$, it is known that the transmission characteristics are not damaged. Therefore, the glass base sintered according to the present embodiment presents high quality.

Moreover, the sintering apparatus according to the present embodiment may be utilized in case of sintering the core or clad formed by the VAD or OVD method.

Moreover, the apparatus according to the first embodiment may be combined with the apparatus according to the second embodiment so as to achieve further effective sintering.

Although the present invention has been described by way of exemplary embodiments, it should be understood that many changes and substitutions may be made by those skilled in the art without departing from the spirit and the scope of the present invention which is defined only by the appended claims.

What is claimed is:

1. Apparatus for sintering a glass base material which is a base material for an optical fiber, the sintering apparatus comprising:
   a control unit which varies a condition for sintering the glass base material; and
   a furnace which sinters the glass base material by heating the glass base material in an atmosphere of dehydration gas and inert gas,
   said control unit including a drive source which supplies the glass base material to said furnace and varies the speed of the glass base material which descends through said furnace based on the position of the glass base material in said furnace.

2. Sintering apparatus of claim 1, wherein said control unit includes a first sensor, connected to said drive source, which detects a position of the glass base material inside said furnace so that said drive source varies the speed of the glass base material which descends through said furnace, based on the position of the glass base material, detected by said first sensor.

3. Sintering apparatus of claim 1, wherein said furnace includes:
   a heating source, provided in the periphery of said furnace, which heats the glass base material; and a gas introducing pipe, connected to said furnace, which introduces a chlorine gas serving as the dehydration gas, and a helium gas serving as the inert gas into said furnace.

4. Sintering apparatus of claim 3, wherein said control unit includes a temperature control unit which controls the temperature of said heating source via a second sensor provided in said furnace.

5. Sintering apparatus of claim 3, wherein said gas introducing pipe branches out to a dehydration-reactive gas passage for introducing the chlorine gas and an inert gas passage for introducing the helium gas.

6. Sintering apparatus of claim 4, wherein said gas introducing pipe branches out to a dehydration-reactive gas passage for introducing the chlorine gas and an inert gas passage for introducing the helium gas.

7. Sintering apparatus of claim 6, wherein a flow rate control unit varies a flow rate ratio of dehydration-reactive gas to that of the inert gas.

8. Sintering apparatus of claim 2, wherein said drive source varies the speed at which the glass base material descends in a manner that the descending speed of the first half of the glass base material in a region corresponding to said heating source is slower than that of the end half of the glass base material in said region.

9. Sintering apparatus of claim 2, wherein there is provided a marker in the glass base material so that the position of the glass base material can be detected by said first sensor.

10. Sintering apparatus of claim 8, wherein the descending speed of the glass base material in the first half of said region is in the range of approximately 0.8 mm per minute to 2.2 mm per minute against a 3.5 mm per minute descending speed of the glass base material in the end half of said region.

11. Sintering apparatus of claim 2, wherein the descending speed of the base material is changed at once and the descending speed is preferably less than 5.0 mm per minute.

12. Sintering apparatus of claim 2, wherein the descending speed of the base material is varied in a gradual manner and the descending speed is preferably less than 5.0 mm per minute.

13. Sintering apparatus of claim 2, wherein the descending speed of the base material is changed in a step-by-step manner, and the descending speed is preferably less than 5.0 mm per minute.

14. Sintering apparatus of claim 4, wherein said temperature control unit performs a proportional integral and differential operation.

15. Sintering apparatus of claim 6, wherein said dehydration-reactive gas passage includes a first flow rate meter for measuring a flow rate of the dehydration-reactive gas and a first flow rate adjusting valve for adjusting a flow rate of the dehydration-reactive gas, and said inert gas passage includes a second flow rate meter for measuring a flow rate of the inert gas and a second flow rate adjusting valve for adjusting a flow rate of the inert gas, and there are provided a flow rate control unit, for controlling the flow rate of gas introduced into the furnace, connected to both said first and second flow rate meters, and there are provided a second drive source connected to said flow rate control unit and said first and second flow rate adjusting valves.

16. Sintering apparatus of claim 7, wherein there are a plurality of positions at which at least one of a gas flow rate ratio of the dehydration-reactive gas against the inert gas, descending speed of the glass base material and the temperature at which the glass base material is heated is changed.

17. Sintering apparatus of claim 7, wherein the ratio of gas passing through said dehydration-reactive gas passage to gas passing through said inert gas passage is in the range of approximately 10% to 50%.

18. Sintering apparatus of claim 4, wherein said temperature control unit varies the temperature in a manner that the temperature difference of said heating source is set within approximately 50° C., and the temperature of said heating source is in the range of approximately 1300° C.–1650° C.

19. Sintering apparatus of claim 1, wherein the descending speed of the glass base material is approximately 0.3 mm per minute to 5.0 mm per minute.

20. Apparatus for manufacturing an optical fiber, comprising:
    a glass base material generating apparatus which generates glass base material serving as a raw material for the optical fiber;
    a glass base material dehydrating and sintering apparatus which dehydrates and sinters the glass base material, the glass base dehydrating and sintering apparatus including:
        a control unit which varies the speed of the glass base material which descends through said furnace based on the position of the glass base material in said furnace; and
        a furnace which sinters the glass base material by heating the glass base material in an atmosphere of dehydration gas and inert gas,
    wherein said control unit includes a drive source which supplies the glass base material to said furnace,
    a glass base material first elongating apparatus which elongates the glass base material to generate a glass rod;
    a glass rod second elongating apparatus which elongates the glass rod for the second time to generate a preform which is parent material of the optical fiber; and
    a preform drawing apparatus which draws the preform to produce the optical fiber.

* * * * *